Dec. 24, 1935.  G. PASSEFIUME  2,025,217
SHOE SOLE TRIMMING MACHINE
Filed Feb. 16, 1932
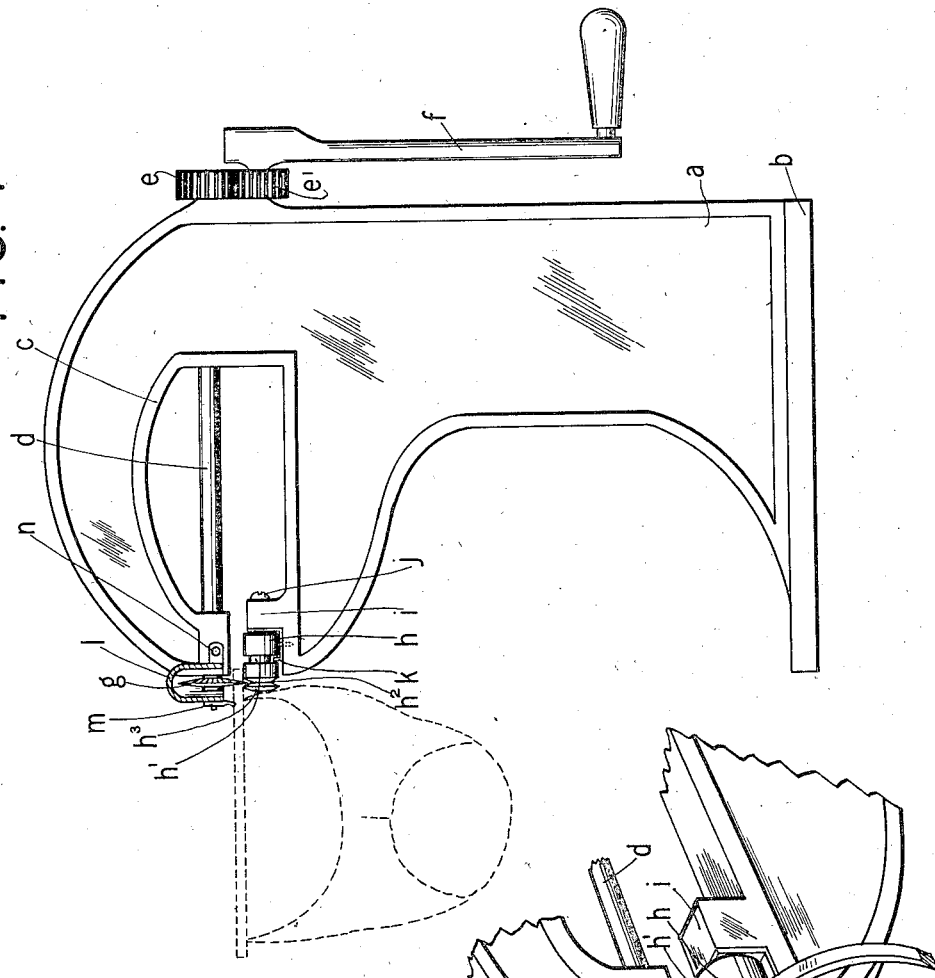
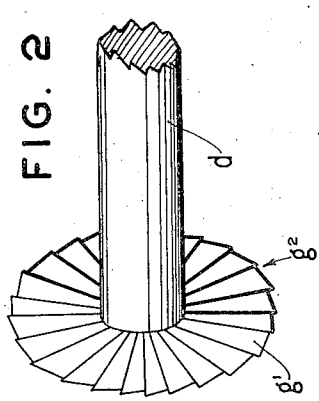
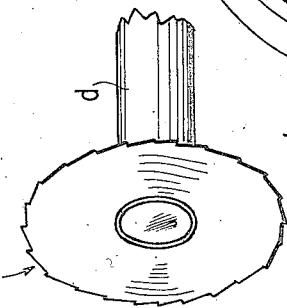
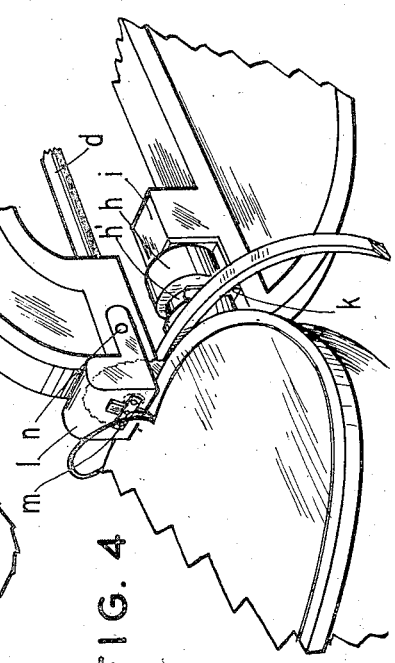
INVENTOR
Giovanni Passefiume
BY 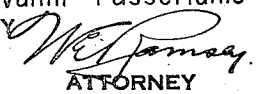
ATTORNEY Patented Dec. 24, 1935

2,025,217

UNITED STATES PATENT OFFICE 2,025,217

SHOE SOLE TRIMMING MACHINE

Giovanni Passefiume, Portland, Oreg.

Application February 16, 1932, Serial No. 593,267

8 Claims. (Cl. 12—18)

My invention relates to devices and particularly bench tools for operating upon the marginal portions of shoe soles. The object of my invention is to provide a convenient bench tool adapted for use by shoe repair men, by which the edge of shoe soles can be trimmed, finished and channeled in one operation with a degree of accuracy which would compare to that of machines used by shoe manufacturers.

A further object of my invention is to provide a bench tool of this character in which the trimming is produced by a rotary knife, toothed upon one side and upon the periphery and smooth upon the other side and proportioned to feed the marginal portion of a shoe thru the machine, as well as to sever the excess marginal portion. The channeling device exercises a restricting factor to the feed of the shoe thru the machine to such a degree that there is a certain amount of slippage between the cutting tool and the marginal portion of the shoe, which slippage produces a series of shearing cuts as opposed to a pinching or continued slice. The toothed or corrugated portion of the cutter is arranged upon the periphery and upon that side of the cutter which faces the marginal portion to be removed and the marks formed by said cutter and feeder thus do not mar the finished portion of the sole.

The details of construction and the mode of operation are hereinafter described with reference to the accompanying drawing, in which:

Fig. 1 is an elevation of my invention as embodied in a bench tool with the shoe to be operated upon shown in dotted lines;

Figs. 2 and 3 are detailed views of the rotary cutter; and

Fig. 4 is a fragmentary perspective view, somewhat diagrammatic, showing the relative arrangement of the cutting and channeling devices.

A bench tool embodying my invention comprises a frame $a$, the lower portion of which is formed into a relatively broad base $b$ for fastening to a counter or similar support and the upper portion is formed into a laterally opening jaw $c$, which is adapted to receive the marginal portion of the shoe sole. At one side of the jaw is a journaled operating shaft $d$, to which is affixed one of a pair of driving gears $e$ and $e'$. A hand crank $f$ drives said pair of gears and thereby the shaft $d$. Fixed to the other end of the shaft is a rotary cutting knife $g$, which is provided with a relatively sharp edge. Said knife is provided upon one face with a series of laterally inclined teeth $g'$ and the peripheral portion $g2$ is toothed or provided with an edge resembling saw teeth. Such face and periphery thus present an uneven or corrugated surface, in which the lateral projections terminate in relatively square shoulders. Thus when said teeth and their corresponding shoulders are forced into the marginal portion of a shoe sole, they tend to become locked or wedged in said sole and the operation of the rotary cutter tends to force the shoe forward at a speed corresponding to the peripheral speed of the cutter $g$.

Upon the other side of the jaw, I mount a rotatable die $h$ pivotally mounted in an upstanding lug $i$, which preferably is an integral portion of the frame $a$. A shaft $j$ extends thru such lug and die. An auxiliary bracket $k$ is arranged to underlie said rotatable die and said die is provided with a central groove $h'$, into which a portion of such auxiliary bracket bears. The end of the bracket is formed into a saddle in which such grooved portion of the rotatable die rests and by which it receives support. Adjacent the ends of such rotatable die is a groove $h2$, which is complementary to the shape of the cutter $g$ and is in registration with the latter. The end $h3$ of said die is smooth-surfaced and constitutes a guide which bears upon the side portion of the upper portion of a shoe to be operated upon and thus positions the trim line upon the marginal portion of the shoe sole and thus said trim line corresponds to the contour of the shoe.

Extending about and guarding the cutter is a shield $l$, which carries a channel cutting tool $m$ upon its extremity. Said channel cutting tool may be an integral portion of said shield, or may be separate therefrom and adjustable therein. Said shield is fastened to the frame $a$ by studs or bolts $n$, the channel cutting tool occupying a fixed predetermined relation and position with respect to the rotatable cutter. The channel line thus is located at predetermined fixed distances from the contour of the upper portion of the shoe, because the guiding element is the extremity of the die $h3$, which bears against the shoe upper.

It is to be understood that the device as shown in the accompanying drawing is used to operate upon a shoe upon which the sole portion is uppermost. If the operator wishes a tool which permits the shoe to be fed into the jaw with the sole down, the rotatable cutter and die elements can be reversed. That is, although I have shown the cutter uppermost and the die beneath, I wish it understood that said parts are equally operable if they are reversed.

As has been set out heretofore, the cutter tends to feed the shoe thru the machine at a speed corresponding to the peripheral speed of the cutter. Slippage of said cutter results from the resistance of the parts and from the drag resulting from the operation of the channeling tool. The slippage thus carries the toothed periphery of the cutter to produce successive slicing cuts along the trim line. The face of the cutter adjacent the finished edge of the shoe sole is smooth and said finished edge is unaffected by the chewing produced by slippage. The roughening of the removed portion is of no consequence as it is waste material.

I claim:

1. In a machine for operating upon the margins of shoe soles, a frame defining an operating jaw, a rotatable cutter and a die, arranged in operating registration with each other and at opposite sides of said jaw, a shield overlying said rotatable cutter, the lower end of said shield carrying a channeling tool, the spacing of said channeling tool and said rotatable cutter having a predetermined relation to each other.

2. In a machine for operating upon the margins of shoe soles, a frame defining an operating jaw, a rotatable cutter and a grooved die, arranged in operating registration with each other and at opposite sides of said jaw and adapted to bear upon opposite faces of the marginal portions of shoe soles, the end of said die extending laterally beyond said cutter a predetermined distance and constituting a guide element for the work.

3. In a machine for operating upon the margins of shoe soles, a frame defining an operating jaw, a rotatable cutter and a grooved die, arranged in operating registration with each other and at opposite sides of said jaw and adapted to bear upon opposite faces of the marginal portions of shoe soles, one face of said rotatable cutter being corrugated, thereby adapted to feed said shoe sole relatively thru said machine, the end of said die extending laterally beyond said cutter a predetermined distance and constituting a guide element for the work.

4. In a machine for operating upon the margins of shoe soles, a frame defining an operating jaw, a rotatable cutter and a grooved rotatable die, arranged in operating registration with each other and at opposite sides of said jaw, a shield overlying said rotatable cutter, the lower end of said shield carrying a channeling tool, the spacing of said channeling tool and said rotatable cutter having a predetermined relation to each other, the face toward the jaw of said frame and the periphery of said rotatable cutter being provided with a series of offset teeth, thereby adapted to feed said shoe sole relatively thru said machine, the end of said die extending laterally beyond said cutter a predetermined distance and constituting a guide element for the work.

5. In a machine for operating upon the margins of shoe soles, a frame defining an operating jaw, a rotatable cutter and a die, arranged in operating registration with each other and at opposite sides of said jaw, a channeling tool, the spacing of said channeling tool and said rotatable cutter having a predetermined relation to each other, the end of said die extending laterally beyond said cutter a predetermined distance and constituting a guide element for the work.

6. In a machine for operating upon the margins of shoe soles, a frame defining an operating jaw, a rotatable cutter having a toothed periphery, said teeth terminating in a series of corrugations extending down one face of said cutter the other face of said cutter being plane, a rotatable die operatively arranged in registration with said cutter, and means interposing sufficient resistance to said feeding to cause the cutter to slip and to produce shearing cuts of the sole by its toothed periphery.

7. In a machine for operating upon the margins of shoe soles, a frame defining an operating jaw, a rotatable cutter having a toothed periphery, said teeth terminating in a series of corrugations extending down one face of said cutter, a rotatable die operatively arranged in registration with said cutter, and an auxiliary operating device interposing sufficient resistance to said feeding to cause the cutter to slip and to produce shearing cuts of the sole by its toothed periphery.

8. In a machine for operating upon the margins of shoe soles, a frame defining an operating jaw, a rotatable cutter having a toothed periphery, said teeth terminating in a series of corrugations extending down one face of said cutter, a rotatable die operatively arranged in registration with said cutter, and a channel cutter interposing sufficient resistance to said feeding to cause the cutter to slip and to produce shearing cuts of the sole by its toothed periphery.

GIOVANNI PASSEFIUME.